US011455902B2

(12) United States Patent
Davis et al.

(10) Patent No.: US 11,455,902 B2
(45) Date of Patent: Sep. 27, 2022

(54) SYSTEM AND METHOD FOR DISPLAYING A LARGE NUMBER OF PARTICIPANTS IN A VIDEOCONFERENCE

(71) Applicant: Foundry College, Inc., San Francisco, CA (US)

(72) Inventors: Michael Laurence Davis, Palo Alto, CA (US); Scott Lane Williams, San Anselmo, CA (US); Stephen M. Kosslyn, San Francisco, CA (US)

(73) Assignee: Foundry College, Inc., San Francisco, CA (US)

(*) Notice: Subject to any disclaimer, the term of this patent is extended or adjusted under 35 U.S.C. 154(b) by 0 days.

(21) Appl. No.: 17/028,873

(22) Filed: Sep. 22, 2020

(65) Prior Publication Data

US 2021/0005098 A1    Jan. 7, 2021

Related U.S. Application Data

(63) Continuation of application No. 16/826,153, filed on Mar. 20, 2020.
(Continued)

(51) Int. Cl.
*G09B 5/14* (2006.01)
*G06Q 10/06* (2012.01)
(Continued)

(52) U.S. Cl.
CPC ......... *G09B 5/14* (2013.01); *G06Q 10/06393* (2013.01); *G06Q 10/063112* (2013.01);
(Continued)

(58) Field of Classification Search
CPC .............................. H04N 5/2628; H04N 7/15
See application file for complete search history.

(56) References Cited

U.S. PATENT DOCUMENTS 9,401,937 B1\* 7/2016 Gottlieb ............... H04W 4/08
2004/0002049 A1\* 1/2004 Beavers ............. H04L 12/1813
434/350
(Continued)

FOREIGN PATENT DOCUMENTS

CN    107147928 A  \*  9/2017

OTHER PUBLICATIONS

"Video Window Layout Options for Cisco Webex Meetings" Release WBS33, Dated Jul. 31, 2018, retrieved from https://help.webex.com/en-us/0qk6j6/Video-Window-Layout-Options-for-Cisco-Webex-Meetings ("Webex Layout") (Year: 2018).\*
"Take the Mundane Out of Your Meetings: Cisco Enhances Webex to Include More of What You Do Every Day to Get Great Work Done," Cisco News Release, Apr. 18, 2018. (Year: 2018).\*
(Continued)

*Primary Examiner* — Jason T Yen
(74) *Attorney, Agent, or Firm* — Steven R. Vosen

(57) ABSTRACT

Systems and methods for displaying a large number of participants in videoconference are described. The participant's video feeds are presented in a continuous scrolling manner, such that each participant's video feed is visible for a part of the time. The participants may select the number of videos displayed at one time on a grid. The system and method monitor which video feeds are being, or about to be displayed, and streams the feeds accordingly. The system and method also provide for classroom-like settings by allowing students to "raise their hand" and be "called on" by an instructor. By scrolling though all of the videos in a meeting, people that are running a session can monitor the other participants, permitting them to select someone to focus on, and allows the other participants to see each other, producing a "sense of belonging."

16 Claims, 5 Drawing Sheets

Related U.S. Application Data

(60) Provisional application No. 62/856,658, filed on Jun. 3, 2019, provisional application No. 62/821,829, filed on Mar. 21, 2019.

(51) Int. Cl.
| | |
|---|---|
| *G09B 5/06* | (2006.01) |
| *G09B 5/10* | (2006.01) |
| *G09B 5/12* | (2006.01) |
| *G09B 7/02* | (2006.01) |
| *G09B 5/00* | (2006.01) |
| G09B 5/02 | (2006.01) |
| G09B 7/06 | (2006.01) |
| G09B 19/00 | (2006.01) |

(52) U.S. Cl.
CPC ............... *G09B 5/00* (2013.01); *G09B 5/06* (2013.01); *G09B 5/065* (2013.01); *G09B 5/10* (2013.01); *G09B 5/12* (2013.01); *G09B 7/02* (2013.01); *G09B 5/02* (2013.01); *G09B 7/06* (2013.01); *G09B 19/003* (2013.01)

(56) References Cited

U.S. PATENT DOCUMENTS

| | | | |
|---|---|---|---|
| 2012/0315616 | A1 | 12/2012 | Fourman |
| 2015/0312520 | A1* | 10/2015 | Nohria ............... H04N 7/15 434/350 |
| 2016/0071424 | A1 | 3/2016 | Harney et al. |
| 2016/0180248 | A1 | 6/2016 | Regan |
| 2016/0350717 | A1 | 12/2016 | Mayumi et al. |
| 2017/0244931 | A1 | 8/2017 | Faulkner |
| 2018/0095656 | A1 | 4/2018 | Ingah et al. |
| 2018/0375676 | A1 | 12/2018 | Bader-Natal et al. |
| 2019/0088153 | A1* | 3/2019 | Bader-Natal ........... H04N 7/155 |

OTHER PUBLICATIONS

New Webex Meetings experience (WBS33.3)—Aug. 26, 2018, retrieved from https://community.cisco.com/t5/collaboration-voice-and-video/new-webex-meetings-experience-wbs33-3-aug2018/ta-p/3695091 (Year: 2018).*

Introducing the New Cisco Webex Meetings Desktop App and UI, video hosted by Rai Johnson, posted Jul. 12, 2018, https://www.youtube.com/watch?v=U2C9BVtGVrk (Year: 2018).*

The Webinar Blog, "Cisco Rebrands/Revamps Webex Collaboration Products," Apr. 18, 2018, retrieved from https://wsuccess.typepad.com/webinarblog/2018/04/cisco-rebrandsrevamps-webex-collaboration-products.html (Year: 2018).*

"Cisco Webex Meetings: Simple, Modern Video Meetings for the Global Workforce," Solution overview Cisco public, 2018, retrieved from https://cdw-prod.adobecqms.net/content/dam/cdw/on-domain-ca/pdfs/brand/cisco/resources/webex-meetings-solution-overview.pdf (Year: 2018).*

"Best Practices for Communicating with Participants in Cisco Webex Training" for Release WBS33, posted Jul. 29, 2019 retrieved from https://help.webex.com/en-us/n1i89j0/Best-Practices-for-Communicating-with-Participants-in-Cisco-Webex-Training (Year: 2019).*

"Unable to See the Order for the Raise Hand Feature in Webex Training" Sep. 21, 2018 Release WBS33 retrieved from: https://help.webex.com/en-us/WBX88014/Unable-to-See-the-Order-for-the-Raise-Hand-Feature-in-Webex-Training (Year: 2018).*

Managing Webex Meetings Release 3.0, First Published: Jan. 24, 2018, last modified Feb. 4, 2021 retrieved from: https://www.cisco.com/c/en/us/td/docs/collaboration/CWMS/3_0/Managing_Meetings/cwms_b_managing-meetings-cwms-release-3-0.pdf (Year: 2021).*

International Search Report and Written Opinion of the International Searching Authority for PCT/US2020/024054, dated Aug. 14, 2020.

* cited by examiner

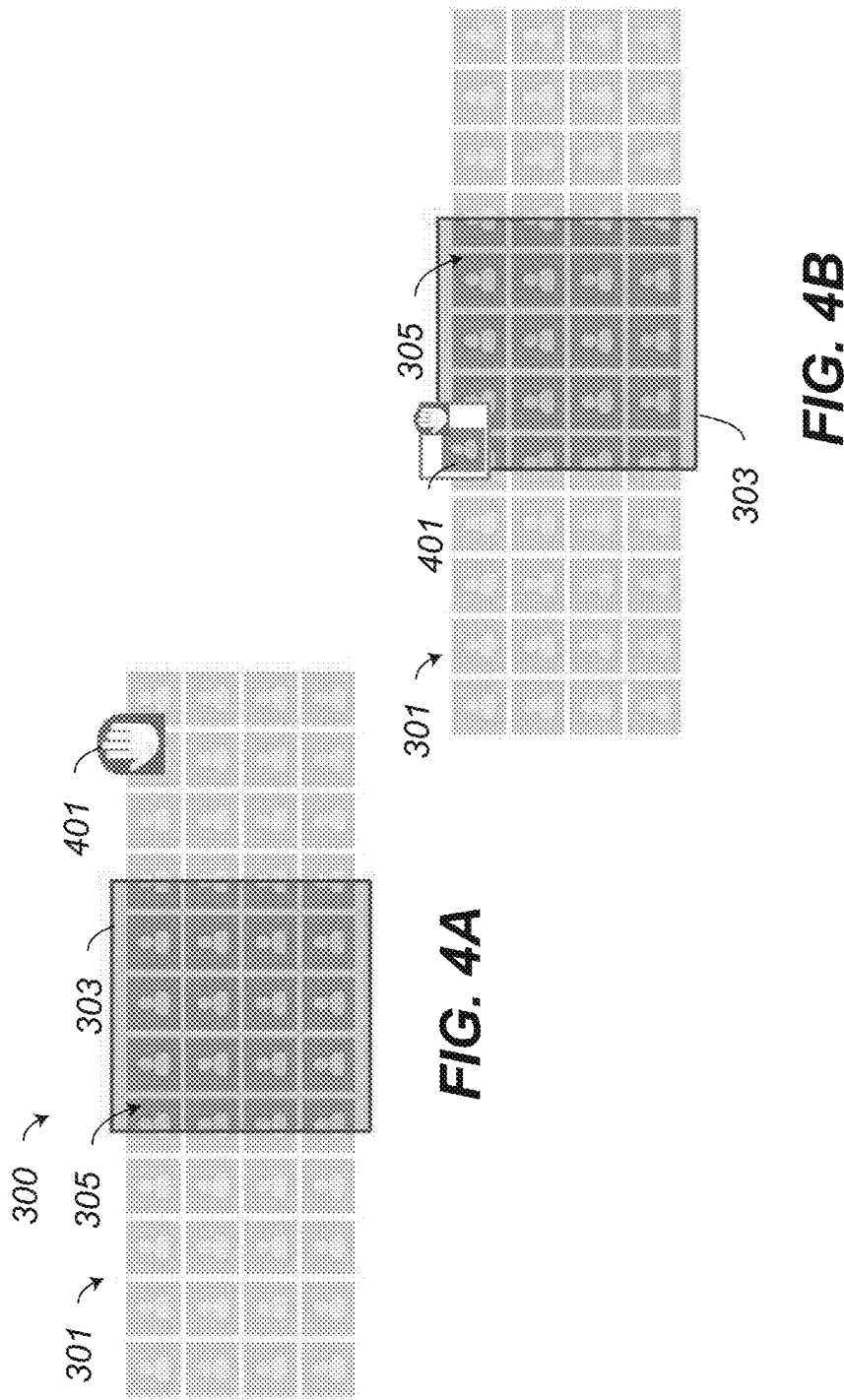

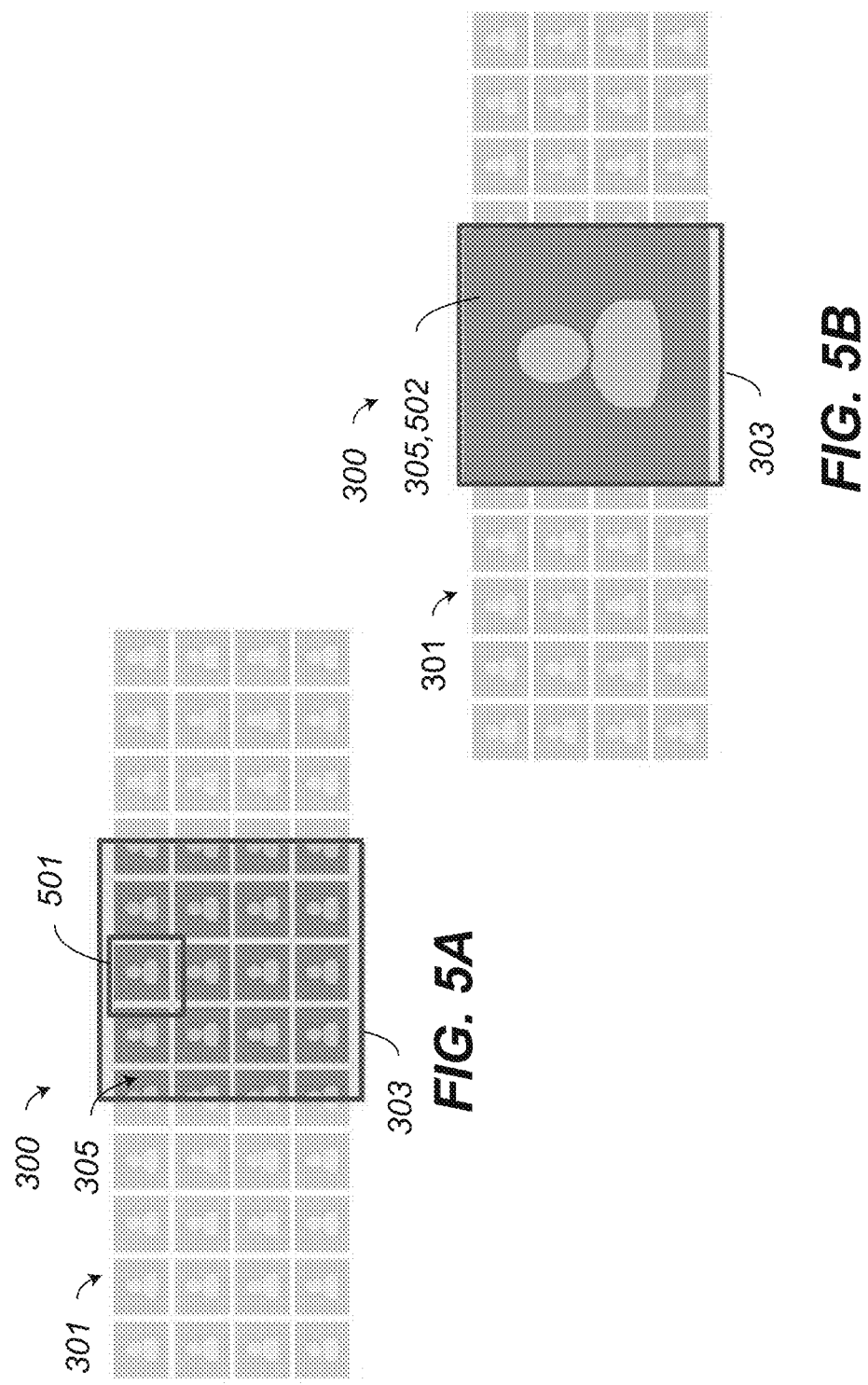

SYSTEM AND METHOD FOR DISPLAYING A LARGE NUMBER OF PARTICIPANTS IN A VIDEOCONFERENCE

CROSS-REFERENCE TO RELATED APPLICATIONS

This application is a continuation of U.S. Nonprovisional application Ser. No. 16/826,153, filed Mar. 20, 2020, which claims the benefit of U.S. Provisional Application No. 62/821,829 filed Mar. 21, 2019 and 62/856,658 filed on Jun. 3, 2019. The contents of each of these applications are hereby incorporated by reference in its entirety.

BACKGROUND OF THE INVENTION

Field of the Invention

The present invention generally relates to teleconferencing, and more particularly to an apparatus and method for presenting, and optionally interacting with, many participants in a teleconference.

Discussion of the Background

Videoconferencing systems can accommodate hundreds of participants. Typically, each participants (also referred to here as a "user") has an associated video feed which may be routed to the other users for display on their computer, phone, or other electronic device. However, even if users are selected to be shown, some users may not be providing a video feed, and thus an icon having the same size as the other displayed videos is provided as a placeholder.

When there are a small number of users, the user's electronic device is capable of displaying all of the other users' videos (or icons). When there are a larger number of users, the video conferencing system or its users must decide how to accommodate all of the videos.

As one example of a prior art system, Zoom (which may be found at https://zoom.us/) includes three video layouts for when there is no screen sharing: Active Speaker, Mini, and Gallery. Of these layouts, the Gallery layout is used to present a display of a large number of users in a grid pattern which expands and contracts as users join and leave the meeting.

Typically, the Gallery layout can accommodate, for example, up to 49 users' videos (or icons) in a single screen of the gallery view. If there are more users than the system can display, then the user may select another screen by clicking on a right or left arrow to view another page of up to 49 participants at a time.

Prior art systems thus accommodate more users than can be displayed at any one time by presenting blocks of users at a time. While this is effective at displaying all of the users' videos, the methods used result in an experience that is very different than one would have from attending an in-person meeting. Thus, for example, in an in-person meeting each attendee can look around the room and get sense of size of the meeting and the reaction of the other attendees, while the users of prior art systems may only view some of the other users at one time unless they take the active step of clicking to another view.

In many meetings, one person or several people are running the session. This leader (or leaders) wants to view the other participants for two reasons: On the one hand, they want to monitor nonverbal reactions among others (e.g., smiles, looks of confusion); on the other hand, they may want to select a participant (based on nonverbal reactions or at random) to question.

Participants also want to view each other, in part to monitor nonverbal reactions among others—they want to know whether their own reactions are shared by others (e.g., as indicated by smiles, looks of confusion).

Thus, there is a need in the art for a videoconferencing system that can display the videos of all participants in a conference. Such a system and method should be scalable for use by a large number of users.

BRIEF SUMMARY OF THE INVENTION

Certain problems in prior art videoconferencing systems and methods are solved by scrolling through the user's videos. In certain embodiments, scrolling though all of the videos in a meeting allows people that are running a session to monitor the other participants, permitting them to select someone to focus on, and allows the other participants to see each other, producing a "sense of belonging."

Certain embodiments provide a method for displaying a plurality of video feeds of a videoconferencing system on the display of a user's device. The method includes: scrolling the plurality of video feeds in a browser on a display of a user's device, where the scrolling includes virtually arranging the plurality of video feeds on a rectangular grid, where the rectangular grid has a height; moving the virtual arranged plurality of video feeds across a rectangular area, where the rectangular area corresponds to a rectangular area in the browser, and where the moving is performed at incremental periods of time in a direction perpendicular to the height; streaming, to the browser, only video feeds of the plurality of video feeds that, at the current time and at the next increment of time, are at least partially within the rectangular area, and displaying, in the browser, the portions of the streamed video feeds within the rectangular area of the browser.

Certain other embodiments provide an apparatus for displaying a plurality of video feeds of a videoconferencing system on the display of a user's device. The apparatus includes a processor programmed to scroll the plurality of video feeds in a browser on a display of user's device, where the processor is programmed to virtually arrange the plurality of video feeds on a rectangular grid, where the rectangular grid has a height; move the virtual arranged plurality of video feeds across a rectangular area, where the rectangular area corresponds to a rectangular area in the browser, and where the move is performed at incremental periods of time in a direction perpendicular to the height; stream, to the browser, only video feeds of the plurality of video feeds that, at the current time and at the next increment of time, are at least partially within the rectangular area, and display, in the browser, the portions of the streamed video feeds within the rectangular area of the browser.

These features together with the various ancillary provisions and features which will become apparent to those skilled in the art from the following detailed description, are attained by the system and method of the present invention, preferred embodiments thereof being shown with reference to the accompanying drawings, by way of example only, wherein:

BRIEF DESCRIPTION OF THE SEVERAL VIEWS OF THE DRAWING

FIGS. 4A and 4B illustrates the effect of the "raise/lower" hand tool on the videos grid; and FIGS. 5A and 5B illustrates the effect of an instructor spotlighting a student from videos grid.

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 2:
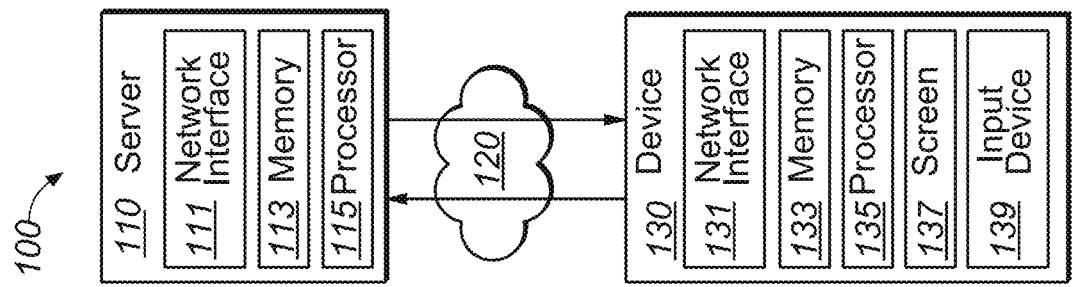
FIGS. 1 and 2 are schematic diagrams illustrative of one embodiment of a videoconferencing system.
Figure 1:
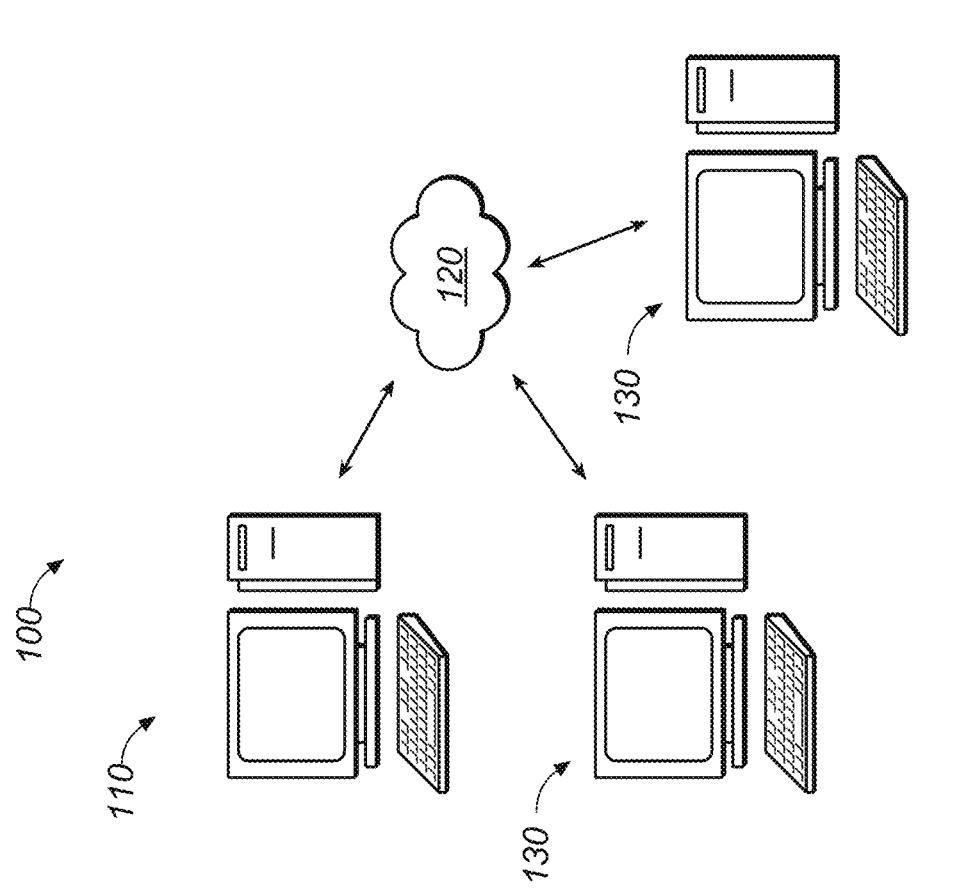

FIGS. 1 and 2 are schematic diagrams which illustrate one embodiment of a videoconferencing system of the present invention as a videoconferencing system 100 including a server 110 for providing programming instructions to a plurality of electronic devices 130 over a network 120. In one embodiment, devices 130 are wireless devices, and network 120 includes wireless communication to the device. In general, server 110 may produce programming instructions, files, or data that may be transmitted over network 120 to operate devices 130. In addition, network 120 may also provide access to instructional material which can be retrieved and displayed on device 130.

In general, a user of device 130 may communicate over network 120 to server 110, which includes programming to receive and transmit information with devices 130. FIG. 2 illustrates one embodiment of videoconferencing system 100 programmed as a system of the present invention.

Server 110 is a computer, a computer system, or network of computers or systems that may include a network interface 111, a memory 113, and a processor 115. Is to be understood that network interface 111, memory 113, and processor 115 are configured such that a program stored in the memory may be executed by the processor to accept input and/or provide output through network interface 111 over network 120 to devices 130.

Devices 130 may be, for example and without limitation, a desktop or portable computer or a cellular telephone, tablet computer, or a portable digital assistant, and includes a network interface 131, a memory 133, a processor 135, a display 137, and an input device 139. Network interface 131 is used by device 130 to communication over a wireless network, such as a cellular telephone or Wi-Fi network, and then to other telephones through a public switched telephone network (PSTN) or to a satellite, or over the Internet. Memory 133 includes programming required to operate device 130 (such as an operating system or virtual machine instructions) and may include portions that store information or programming instructions obtained over network interface 131, or that are input by the user (such as telephone numbers or images from a device camera (not shown). In one embodiment display 137 is a touch screen, providing the functions of the screen and input device 139. Input device 139 may be a keyboard, a touchscreen, a trackball, a mouse, a microphone or a camera which generates a video feed and a microphone which generates an audio feed.

The following discussion presents embodiments of videoconferencing system 100 wherein server 110 and devices 130 include programs stored in memory 113 and 133, respectively, which instruct processor 115 and 135, respectively, to communicate over the network 120, including retrieving data stored in memory 113, and provide output on displays, such as display 137.

Videoconferencing system 100 provides communication between devices 130 using, but not limited to, API Servers including a video service API which provides for video chatting between different devices 130. As descried subsequently, video Service is used to: allow users to "enter into" and "exit from" the videoconferencing meeting space where each user is streaming audio and video from their computing device and where others in the space have access (can view and hear) the video and audio streams of all others in that same meeting space; and allows some users of the videoconferencing system to turn other user's audio and/or video streams on and off; present video/audio of all other users.

In certain embodiments, memory 133 of devices 130 are programmed to run a browser web app that is displayed on display 137 and is configured to present the videos of the other users using the video service API described above. In certain embodiments, devices 130 are programmed to display a portion of all the user's video feeds at a time and scrolls the video feeds. If a user's video feed cannot be displayed for some reason, such as due to network bandwidth limitation, the space intended for a user's video feed may be replaced with an icon or image, such as a photograph of the user.

In certain other embodiments the browser web app in device 130 is programmed with a videos grid widget. This widget is a grid (1×1, 2×2, 3×3, or 4×4) of video feeds of all the users. The video feeds scroll horizontally (either right to left or right to left) so that only 16 video feeds (at most) can be seen at the same time. The user can adjust the size of the matrix, which allows them to cope with poor bandwidth or using an older, slower computer.

Figure 3A:
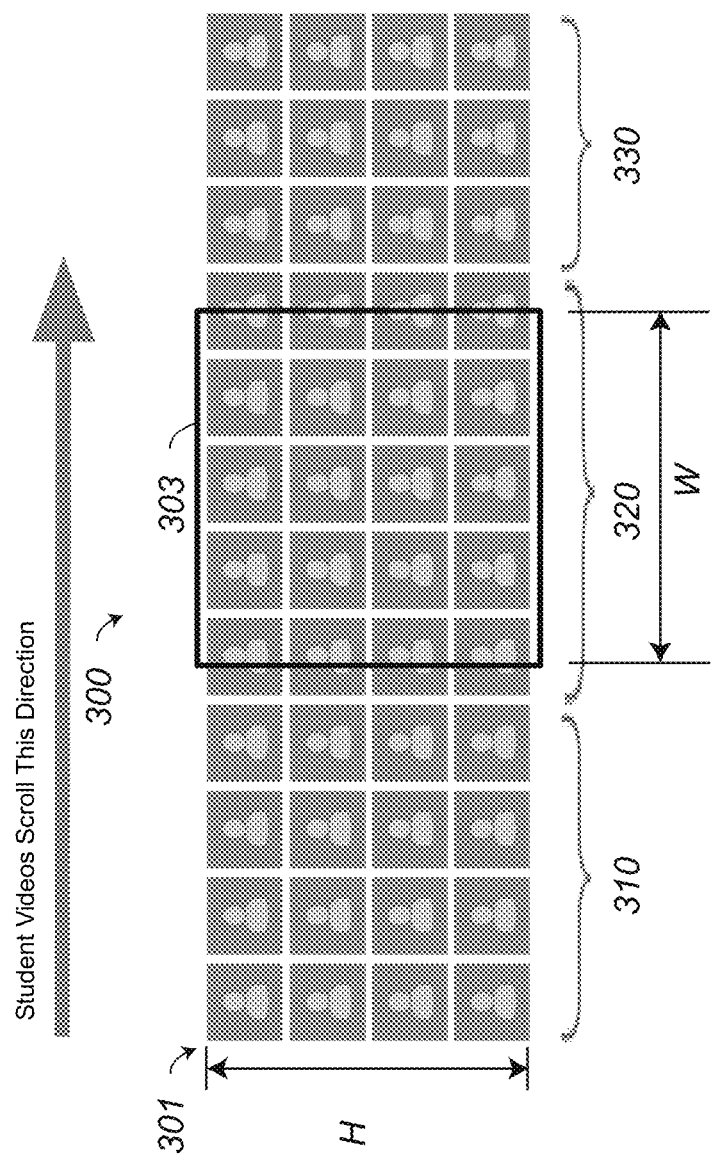
FIG. 3A illustrates the display of a plurality of video feeds in the videos grid.

Each user's browser web app generates a video feed from the camera of the user's device 130. To provide the appearance of a room full of people, it is desirable for the users to view as many of these video feeds as possible. FIG. 3A illustrates a videos grid 300 as displayed on display 137 of a user's device 130, and which may be generated, for example and without limitation, using the videos grid widget described above.

FIG. 3A illustrates the display of a plurality of video feeds 301 in the videos grid 300. In certain embodiments, each video feed of the plurality user's video feeds is obtained from one of the plurality of browser web apps and are arranged on a rectangular grid for display within an area 303 of the videos grid. Thus, for example and without limitation, video feeds 301 in FIG. 3A are shown, for example and without limitation, as being arranged in columns for 4 video feeds and extending as far horizontally as is necessary to fit all of the video feeds, and will repeat to form an endless loop of videos. Of video feeds 301, video feeds 320 are at least partially within area 303, video feeds 310 are just about to scroll into area 303, and video feeds 330 have just previously scrolled through area 303.

Videos grid 300 scrolls all of the video feeds horizontally, so that a portion of all of the video feeds are visible at one time, such that each video is scrolled across area 303 within some reasonable time, such as 10 seconds, in an endless loop. Over the course of a specific amount of time, such as two minutes, all of the video feeds will scroll through area 303. When it is determined that a video feed is to be displayed in videos grid 300, the video service API call is made to retrieve the video feed for display. In various embodiments, area 303 and video feeds 301 are arranged to display, for example, 1×1, 2×2, 3×3, or 4×4 of video feeds simultaneously. In certain embodiments, the video feeds are turned on just prior to moving into area 303 so that the effect is to view a continuous movement of video feeds.

In certain embodiments, the plurality user's video feeds are arranged, for example and without limitation, by virtually arranging the video feeds on a rectangular grid having the height of area 303 and moving the virtual arranged video feeds across a rectangular area that corresponds to area 303. Thus, for example, if area 303 has the height to accommodate 4 video feeds, then the grid will have a height of 4 video feeds. The movement of the video feed across area 303 is incremental—that is they move incrementally by a distance less that is less than width of the video feed, and thus appear to crawl across the area. As the video feeds move, the video feeds that are streamed to the browser are only those video feeds that: are at least partially in area 303; or will be at least partially in area 303 at the next increment of time are provided to the videos grid 300 for display. Thus, all of the video feeds will appear to move smoothly across area 303 (moving from left to right or from right to left) while minimizing the number of video feeds sent to the browser for viewing.

In certain embodiments, the virtual arrangement of videos on the grid is fixed as the videos scroll. In certain other embodiments, the arrangement of videos is randomized on the grid. In other embodiments, copies of one or more video feeds are duplicated and placed on the grid, in a fixed or randomized arrangement and the copies may be replaced after moving off of area 303. The placement of video feed copies on the grid has the effect of the user's not being able to predict when their video feed will be presented.

Figure 3B:
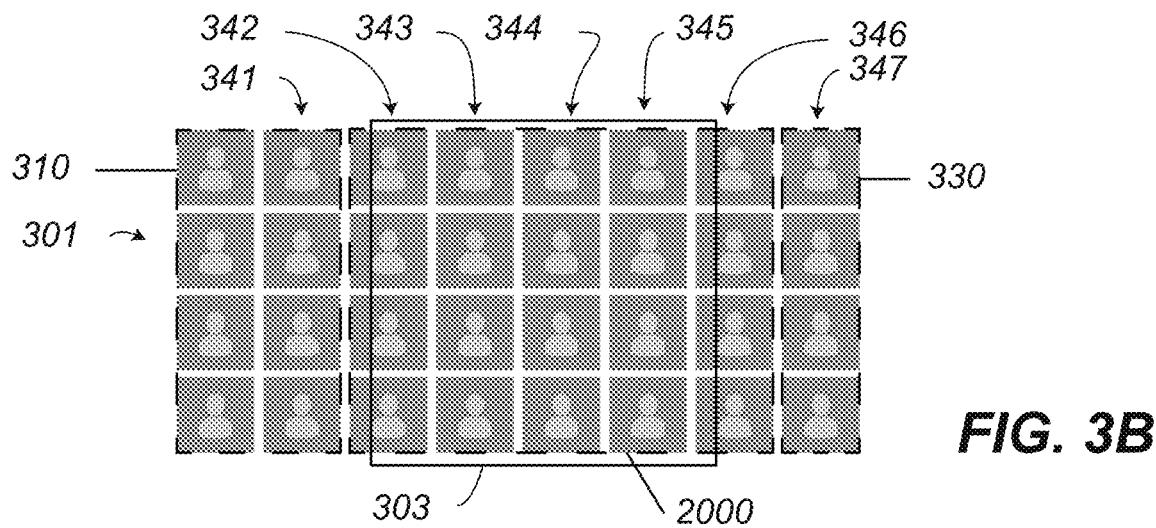
FIGS. 3B, 3C, and 3D illustrate three sequential views of the videos grid of FIG. 3A.
Figure 3C:
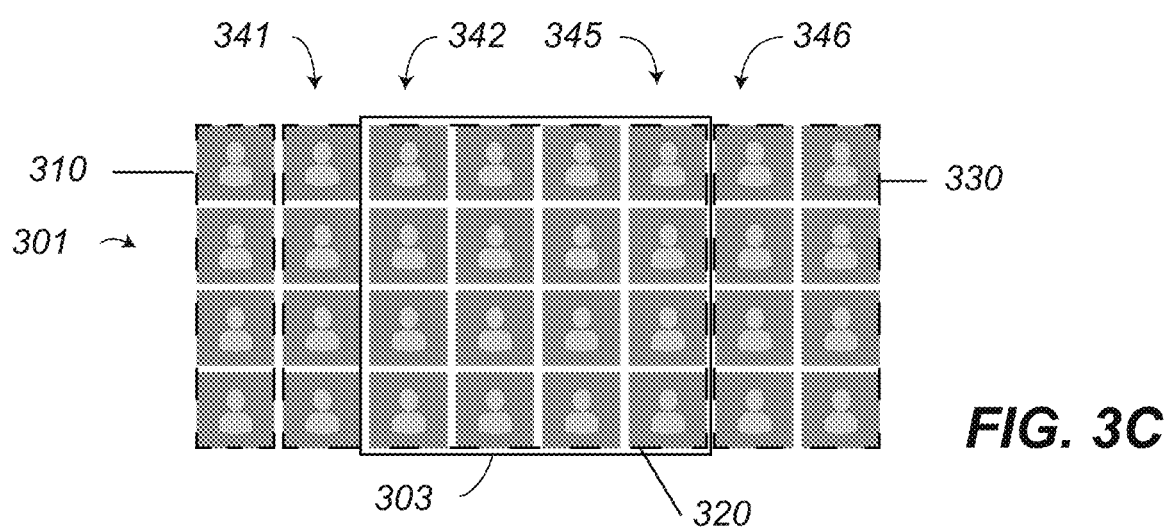
Figure 3D:
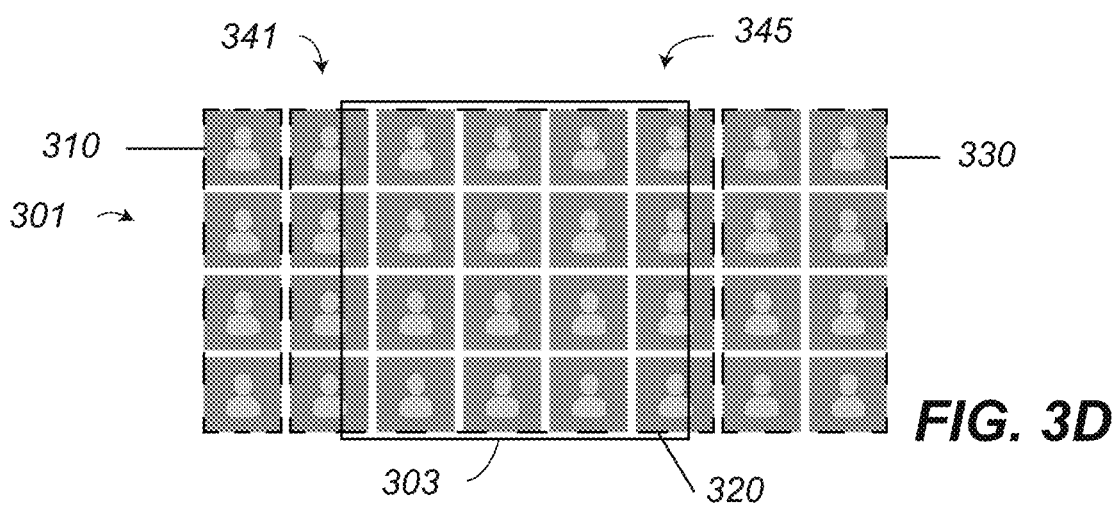

FIGS. 3B, 3C, and 3D illustrate three sequential views of the videos grid 300, with adjacent video feed columns 341, 342, 343, 344, 345, 346, and 347 as they scroll past within area 303.

FIG. 3B shows video feeds 301 at a first time, where at least partially viewable video feeds 320 includes video feed columns 342, 343, 344, 345, and 346, where video feeds 310 includes video feed column 341, and where video feeds 330 includes video feed column 347.

In certain embodiments, the horizontal scrolling of video feeds 301 is controlled by JavaScript code within the browser web app. The JavaScript code operates as a "timer" that is continuously reset after some time interval, at which time the JavaScript code moves the plurality of video feeds 301 a distance to the left.

FIGS. 3C, and 3D illustrate additional sequential views of the videos grid 300 after the view of FIG. 3B. When a video feed column has moved so that it is no longer at least partially within area 303, all of the video streams in that column are shut down. Thus, for example, in going from the view of FIG. 3B to that of FIG. 3C, video feed column 346 has moved out of area 303, and thus the video feeds comprising video feed column 346 are turned off, and in going from the view of FIG. 3C to that of FIG. 3D, no video feed columns have moved out of area 303, and thus no video feeds are turned off.

When a video feed column is about to move into within area 303, all of the video streams in that column are turned on. Thus, for example, in going from the view of FIG. 3B to that of FIG. 3C, video feed column 341 is about to move into area 303, and thus the video feeds comprising video feed column 341 are turned on, and in going from the view of FIG. 3C to that of FIG. 3D, no new video feeds are about to move into area 303, and thus no video feeds are turned on.

In certain embodiments, browser web app is programmed to accept a user input that signals to videoconferencing system 100 that the user wishes to speak through a "raise hand" symbol on their browser. When a user selects the raise hand symbol, videoconferencing system 100 responds by moving video feeds 301 such that that user's video feed is within videos grid 300 and also displays an image of a hand on that user's video feed. This feature is particularly useful in a classroom setting, where an instructor may call on a student during class, where one of the user is an instructor and the remaining users are students. The use of the present invention in a classroom setting is described in co-owned U.S. patent application Ser. No. 16/826,153, filed Mar. 20, 2020, which is incorporated herein by reference.

FIGS. 4A and 4B illustrate the effect a user selecting the raise hand symbol. In the example of FIG. 4A, a video feed 401 of a student making this selection is not within area 303. As illustrated in FIG. 4B, videos grid 300 responds by scrolling the video feeds so that that video feed 401 is within area 303, and superimposes a small raised hand image over video feed 401 and surrounds the icon with an orange border so that it is clear which user is requesting attention. The icons for users with raised hands are not scrolled; they are pinned in the matrix so that they are visible until the instruction either clicks on them or dismisses them.

In one embodiment, a browser web app presents a "raise hand" tool in at the bottom of the browser web app. When a user clicks the "raise hand" tool, a call is placed to a Publish/Subscribe Service, which sends a message to all of the browser web apps in videoconferencing system 100. When each browser web app receives this message, device 130 are programmed to stop the scrolling of videos grid 300, each browser web app determines if video feed 401 is within area 303 and arranges videos grid 300 such that video feed 401 is within area 303.

If an instructor of a teleconferenced class wants to "call on" the user with the raised hand and "put them in the spotlight," they click on the video feed 401 from the instructor's browser web app. In certain embodiments, this results in a call being placed to a Publish/Subscribe Service, which sends instructions to change the videos grid 300 of each browser web app, and to replace all of the other videos feeds in videos grid 300 to display only video feed 401. In addition, the instructor's browser web app makes a call to the Publish/Subscribe Service telling it that the clicked on user is "in the spotlight" and sends a "user is spotlit" message out to all student's browser web apps, and the browser web apps are programmed to respond by presenting only video feed 401 in videos grid 300.

FIGS. 5A and 5B illustrates the effect of an instructor spotlighting a user from videos grid 300. During a class the instructor may wish to "spotlight" one user and only show the spotlighted user's video feed. As illustrated in FIG. 5A, the instructor, operating an instructor's browser web app may spotlight a user by clicking on the user's video feed 501 from within area 303. As illustrated in FIG. 5B, videos grid 300 responds to this selection by switching to a 1×1 view of that video feed, effectively viewing and broadcasting only the spotlit user to browser web apps.

Once the instructor has called on a user and put them "in the spotlight," they can then take them out of the spotlight. To do this, the instructor operating the instructor's browser web app clicks on the spotlit user's video, resulting in a call being placed the Publish/Subscribe Service, which causes user's video to be removed and then replaced with the matrix of the entire class' videos as videos grid 300. Specifically, messages are sent to student's browser web apps, which are programmed to resume showing the videos grid 300.

One embodiment of each of the methods described herein is in the form of a computer program that executes on a processing system, e.g., a one or more processors that are part of a computer network. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. Thus, for example, in certain embodiments scrolling is vertical instead of horizontal as described above. In another embodiment, a user may provide a still image for the video feed. In yet another embodiment, the system may substitute a user's video feed with a still image is not available for any reasons.

Further, functionality may be added or deleted from the block diagrams and operations may be interchanged among functional blocks. Steps may be added or deleted to methods described within the scope of the present invent

We claim:

1. A method for displaying a plurality of video feeds of a videoconferencing system on the display of a user's device, said method comprising:
   scrolling the plurality of video feeds in a browser on a display of a user's device, where said scrolling includes virtually arranging the plurality of video feeds on a rectangular grid, where the rectangular grid has a height, and where each arranged video feed of the arranged plurality of video feeds has a width;
   moving the virtual arranged plurality of video feeds across a rectangular area, where the rectangular area corresponds to a rectangular area in the browser, where the moving is performed at incremental periods of time in a direction perpendicular to the height, and where the moving is less than the width of any of the video feeds of the arranged video feeds;
   streaming, to the browser, only video feeds of the plurality of video feeds that, at the current time and at the next increment of time, are at least partially within the rectangular area, and
   displaying, in the browser, the portions of the streamed video feeds within the rectangular area of the browser,
   such that the displayed video feeds appear to crawl across the rectangular area of the browser.

2. The method of claim 1, where said method further comprises:
   accepting the selection of one video feed of said plurality of video feeds, and
   enlarging the selected video feed to occupy the rectangular area in the browser.

3. The method of claim 2, where said method further comprises:
   accepting the selection of the enlarged selected video feed a second time, and
   return to scrolling the plurality of video feeds in the browser.

4. The method of claim 1, where said method further comprises,
   accepting the selection of one video feed of said plurality of video feeds, and
   highlighting the selected video feed in the rectangular area.

5. The method of claim 1, where said method further comprises,
   accepting the selection of one video feed of said plurality of video feeds, and
   requesting a response from the other end of the video feed.

6. The method of claim 1, where said virtually arranging each video feed maintains the arrangement during scrolling.

7. The method of claim 1, where said virtually arranging of each video feed randomly arranges video feeds that are not streaming to the browser.

8. The method of claim 1, where said virtually arranging arranges each video feed of the plurality of video feeds and one or more copies of the one or more video feeds of the plurality of video feeds on the rectangular grid.

9. An apparatus for displaying a plurality of video feeds of a videoconferencing system on the display of a user's device, said apparatus comprising:

a processor programmed to scroll the plurality of video feeds in a browser on a display of user's device, where the processor is programmed to virtually arrange the plurality of video feeds on a rectangular grid, where the rectangular grid has a height, and where each arranged video feed of the arranged plurality of the video feeds has a width;

move the virtual arranged plurality of video feeds across a rectangular area, where the rectangular area corresponds to a rectangular area in the browser, where the move is performed at incremental periods of time in a direction perpendicular to the height, and where the distance of the move is less than the width of any of the video feeds of the arranged video feeds;

stream, to the browser, only video feeds of the plurality of video feeds that, at the current time and at the next increment of time, are at least partially within the rectangular area, and display, in the browser, the portions of the streamed video feeds within the rectangular area of the browser, such that the displayed video feeds appear to crawl across the rectangular area of the browser.

10. The apparatus of claim 9, where said processor is further programmed to:

accept the selection of one video feed of said plurality of video feeds, and enlarge the selected video feed to occupy the rectangular area in the browser.

11. The apparatus of claim 10, where said processor is further programmed to:

accept the selection selecting the enlarged selected video feed a second time, and scroll the plurality of video feeds in the browser.

12. The apparatus of claim 9, where said processor is further programmed to:

accept the selection of one video feed of said plurality of video feeds, and highlight the selected video feed in the rectangular area.

13. The apparatus of claim 9, where said processor is further programmed to:

accept the selection of one video feed of said plurality of video feeds, and request a response from the other end of the video feed.

14. The apparatus of claim 9, where said processor is further programmed to maintain the arrangement of the each video feed.

15. The apparatus of claim 9, where said processor is further programmed to randomly arranges any video feeds that are not being streamed to the browser.

16. The apparatus of claim 9, where said processor is further programmed to virtually arrange each video feed of the plurality of video feeds and one or more copies of the one or more video feeds of the of video feeds on the rectangular grid.

* * * * *